Apr. 17, 1923.

P. C. MADSEN 1,452,205

POST PULLER

Filed Jan. 26, 1922

2 Sheets-Sheet 1

Inventor

Peder C. Madsen

Apr. 17, 1923.

P. C. MADSEN

POST PULLER

Filed Jan. 26, 1922

1,452,205

2 Sheets-Sheet 2

Inventor

Peder C. Madsen.

Patented Apr. 17, 1923.

1,452,205

UNITED STATES PATENT OFFICE.

PEDER C. MADSEN, OF GRANADA, MINNESOTA.

POST PULLER.

Application filed January 26, 1922. Serial No. 531,955.

*To all whom it may concern:*

Be it known that I, PEDER C. MADSEN, a citizen of the United States, residing at Granada, in the county of Martin and State of Minnesota, have invented certain new and useful Improvements in a Post Puller, of which the following is a specification.

This invention relates to post pullers and more particularly to an improved simplified structure for use in pulling posts from the ground.

The primary object of the invention is to provide a manually operated pivoted structure adapted to effectively grip the fence post whereby a handle attached to the mechanism may be conveniently operated for imparting a lifting motion to post so that it may be easily withdrawn from the ground.

Other objects of the invention will appear upon consideration of the following detail description and accompanying drawings, wherein:—

Figure 1:
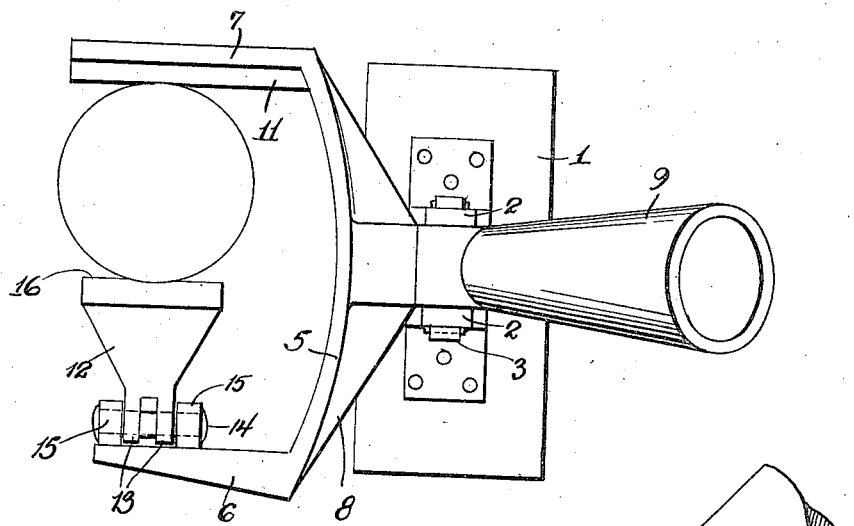
Figure 2:
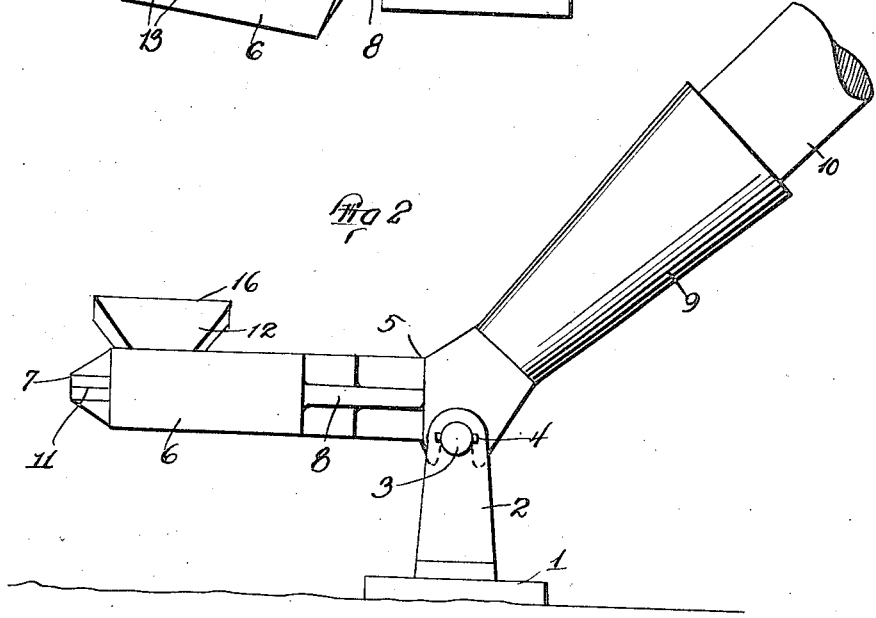
Figure 3:
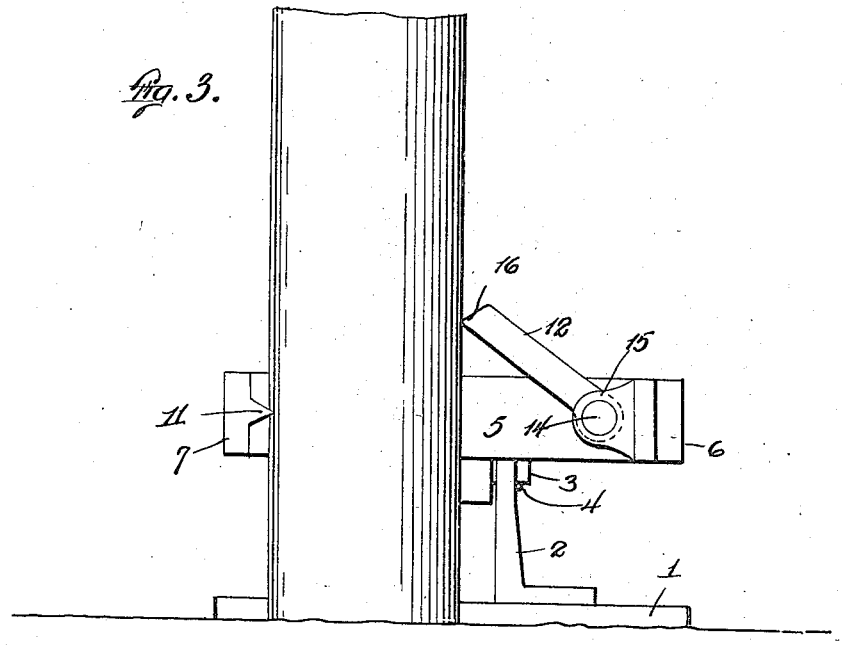
Figure 4:
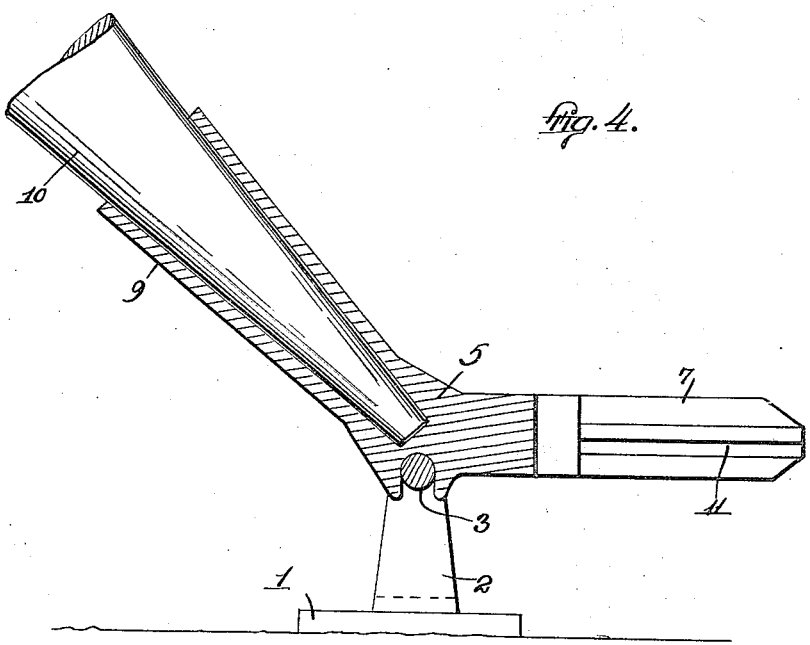

Figure 1 is a plan view of the device constructed in accordance with my invention, Figure 2 is a side view thereof, Figure 3 is a front elevation showing the apparatus applied to a fence post, and Figure 4 is a cross section through the center of the device.

Referring to the drawing by numerals, the base plate 1 may be of any desired dimensions and forms a support for the standard 2 which consists of laterally spaced members equipped with a bearing rod 3 having suitable pins 4 at the outer ends to prevent displacement of the bearing rod from the standard 2. Mounted to pivot upon the bearing rod 3 is the lifting mechanism 4 which consists of the substantially U-shaped body 5 having the opposite parallel arms 6 and 7 and provided with laterally projecting ribs 8 to give strength to the body. Projecting in the opposite direction and at an angle from the arms 6 and 8 is an elongated socket member 9 adapted to receive a handle 8 of any suitable length. The arm 7 is provided with a longitudinally extending cleat 11, which by referring to Fig. 3 of the drawing, will be seen to be substantially triangular in cross section so that a sharp biting edge is provided to grip the fence post.

For the purpose of co-operating with this cleat to effectively grip the fence post, a pivoted gripping dog 12 is provided which is shaped as shown in Fig. 1 and is provided with ears or lugs 13 having apertures to receive a pivot 14 which is mounted in the lugs 15 carried by the arm 6. This gripping dog 12 normally extends upwardly and has the sharpened edge 16 adapted to engage the opposite side of the fence post to that engaged by the cleat 11 so that when upward swing is imparted to the U-shaped body member, the dog 12 will be thrust into the fence post and will co-operate with the sharpened cleat 12 to obtain a firm grip whereby a downward pressure on the lever or handle 10 will cause the fence post to be pulled out of the ground. In this manner the handle 10 may be reciprocated until the fence post is entirely removed.

Minor changes may be made in the details of construction without departing from the spirit of the invention or the scope of the claims hereunto appended.

What is claimed is:—

1. A post puller of the character described comprising a supporting standard equipped with a bearing rod, a substantially U-shaped bracket member pivoted on the bearing rod and including parallel arms, one of the arms being provided with a sharpened cleat to engage one side of the fence post, the other arm being mounted with a pivoted gripping dog adapted to engage the opposite side of the fence post, the said body having a socket extending from the pivoted portion in a direction opposite to that of the bracket member, and a handle adapted to be mounted in the socket.

2. A post puller comprising a supporting base having a standard mounted thereon, a bearing rod mounted in the standard, a pivoted member including a U-shaped bracket forwardly projecting parallel arms, one of the arms being provided with a sharpened cleat, the other arm being provided with lugs carrying a pivot pin, and a pivoted gripping dog mounted upon the said pivot pin and adapted to normally extend upwardly from the bracket whereby its pointed end may grip the post when the said bracket member is swung upwardly on its pivot and means to swing the said bracket member on its pivot.

In testimony whereof, I have affixed my signature in the presence of two witnesses.

PEDER C. MADSEN.

Witnesses:
 JOHN MADSEN,
 E. C. MILLER.